United States Patent
Chen

(10) Patent No.: US 7,916,076 B2
(45) Date of Patent: Mar. 29, 2011

(54) METHOD FOR CALCULATING CURRENT POSITION COORDINATE

(75) Inventor: Hung-Sheng Chen, Banqiao (TW)

(73) Assignee: Altek Corporation, Hsinchu (TW)

( * ) Notice: Subject to any disclaimer, the term of this patent is extended or adjusted under 35 U.S.C. 154(b) by 247 days.

(21) Appl. No.: 12/418,638

(22) Filed: Apr. 6, 2009

(65) Prior Publication Data

US 2010/0156718 A1    Jun. 24, 2010

(30) Foreign Application Priority Data

Dec. 19, 2008    (TW) .............................. 97149877 A

(51) Int. Cl.
*G01S 19/24*    (2010.01)
*G01S 19/00*    (2010.01)

(52) U.S. Cl. ................. 342/357.63; 342/357.2

(58) Field of Classification Search ............ 342/357.12
See application file for complete search history.

(56) References Cited

U.S. PATENT DOCUMENTS

| | | | |
|---|---|---|---|
| 6,167,347 A * | 12/2000 | Lin ................................ | 701/214 |
| 6,266,584 B1 * | 7/2001 | Hur-Diaz et al. ................ | 701/13 |
| 6,424,890 B1 * | 7/2002 | Syrjarinne et al. .............. | 701/13 |
| 6,429,808 B1 * | 8/2002 | King et al. ................ | 342/357.44 |
| 7,567,208 B2 * | 7/2009 | Mo et al. .................. | 342/357.25 |

* cited by examiner

*Primary Examiner* — Thomas H Tarcza
*Assistant Examiner* — Frank McGue
(74) *Attorney, Agent, or Firm* — Stevens & Showalter LLP

(57) ABSTRACT

A method for calculating current position coordinate is applied to a global positioning system (GPS) receiver. When positioning at a current time point, the GPS receiver directly calculates a code delay and a carrier frequency of each satellite and position coordinate of the GPS receiver at a current positioning time point by utilizing an ephemeris data of each satellite and position coordinate of the GPS receiver at a last positioning time point, thereby greatly lowering an operation amount, so as to reduce the power consumption.

11 Claims, 4 Drawing Sheets

METHOD FOR CALCULATING CURRENT POSITION COORDINATE

CROSS-REFERENCE TO RELATED APPLICATIONS

This non-provisional application claims priority under 35 U.S.C. §119(a) on Patent Application No(s). 097149877 filed in Taiwan, R.O.C. on Dec. 19, 2008 the entire contents of which are hereby incorporated by reference.

BACKGROUND OF THE INVENTION

1. Field of Invention

The present invention relates to a global positioning system (GPS), and more particularly to a method for calculating current position coordinate applicable to a GPS receiver.

2. Related Art

Global navigation satellite system is also called GPS. In the past, the GPS is only limited to military purpose and industrial purpose. With the continuous development of the technology, the GPS begins to be applied to various civil purposes. Generally, the GPS products mainly refer to GPS receivers applied to various purposes, for example, receivers for aviation and voyage purposes, automobile navigation devices, hand-held receivers for mountaineering and entertainment, and other types of communication products. The common GPS product mainly includes an internal antenna, a chipset, external keys, a display panel, and other related parts.

The GPS receiver determines positions by utilizing satellites surrounding the earth.

When each satellite operates, one coordinate value representing the position (known) exists at any moment. The position coordinate of each satellite is provided by a respective ephemeris data of each satellite.

The position coordinate of the GPS receiver is unknown. The GPS receiver compares a clock of a satellite signal of each satellite and a clock generated in the GPS receiver, so as to calculate the time cost during a process of transmitting the satellite signal. The time difference (that is, the time cost during the process of transmitting the satellite signal) value is multiplied by an electric wave transmission speed (generally the speed of light), so as to calculate a distance between the satellite and the GPS receiver, which is called a pseudo range. According to the triangle vector, a related equation is given for the pseudo range.

When the satellite signal of one satellite is received, one related equation is given. Therefore, when the satellite signals of three satellites are received, a plane coordinate (that is, longitude value and latitude value) is calculated. The calculated plane coordinate is the position coordinate of the GPS receiver. When the satellite signals of four satellites are received, in addition to the plane coordinate (that is, the longitude value and the latitude value), a height value is also calculated. Further, if the satellite signals of more than five satellites are utilized, the accuracy of the calculated position coordinate is improved.

The satellite repeatedly broadcasts the satellite signal once at each millisecond (ms), such that the GPS receiver calculates a phase difference of the satellite by utilizing a phase lock loop (PLL) at each ms, and calculates a translation amount of the satellite by utilizing a delay lock loop (DLL). Then, the GPS receiver corrects a carrier frequency by utilizing the calculated phase difference, and corrects a code delay by utilizing the calculated translation amount. When positioning, the GPS receiver calculates the position coordinate thereof by utilizing the code delay at that time.

Generally, the GPS receiver re-calculates the position coordinate at each second, such that the position coordinate of the GPS receiver at each second are the latest.

In other words, in order to continuously track the position of the satellite, the GPS receiver needs to perform a great amount of operation (1000 times) at each second, so as to ensure that the position coordinate calculated at each second is correct.

SUMMARY OF THE INVENTION

In view of the above problems, the present invention is directed to a method for calculating current position coordinate, thereby solving the problem of the prior art of large calculation amount and power consumption.

The present invention provides a method for calculating current position coordinate applicable to a GPS receiver.

Firstly, at least three satellites are searched for, so as to obtain an ephemeris data of each satellite at a first time point.

Position coordinate of the GPS receiver at a first time point are calculated by utilizing the ephemeris data of each satellite.

When positioning at a second time point, firstly position coordinate of each satellite at the second time point is calculated by utilizing the ephemeris data of each satellite, in which the second time point is later than the first time point;

Then, a relative distance between the position coordinate of the GPS receiver at the first time point and the position coordinate of each satellite at the second time point is calculated, and a maximum moving distance of the GPS receiver from the first time point to the second time point is evaluated.

Distance ranges corresponding to each satellite are calculated according to each relative distance and the moving distance, so as to calculate a code delay of each satellite in the corresponding distance range, thus obtaining the code delay of each satellite at the second time point.

The position coordinate of the GPS receiver at the second time point are calculated by utilizing the code delay at the second time point.

Then, a carrier frequency of each satellite at the second time point is calculated and then corrected by utilizing a flying speed of each satellite at the second time point and the position coordinate of the GPS receiver at the second time point. Therefore, the satellite may be continuously tracked by utilizing the corrected carrier frequency.

Similarly, the GPS receiver performs the positioning at a third time point by utilizing the position coordinate of the GPS receiver at the second time point.

In other words, after starting and self-testing, the GPS receiver searches for at least three satellites, so as to obtain an ephemeris data of each satellite. During positioning, position coordinate of the GPS receiver at a current time point are calculated by utilizing the ephemeris data of each satellite and the position coordinate of the GPS receiver at a last time point.

When positioning at the current time point, the GPS receiver calculates position coordinate of each satellite at the current time point by utilizing the ephemeris data of each satellite.

Then, a relative distance between the position coordinate of the GPS receiver at the last time point and the position coordinate of each satellite at the current time point is calculated, and a maximum moving distance of the GPS receiver in a time range from the last time point to the current time point is evaluated.

Then, distance ranges corresponding to each satellite are calculated according to the relative distance corresponding to each satellite and the maximum moving distance of the GPS receiver.

Then, a code delay of each satellite in the corresponding distance range is calculated by utilizing the DLL, so as to obtain the code delay of each satellite at the current time point.

The position coordinate of the GPS receiver at the current time point are calculated by utilizing the code delay of each satellite at the current time point.

Further, a carrier frequency of each satellite at the current time point is calculated and corrected by utilizing the flying speed of each satellite at the current time point and the position coordinate of the GPS receiver at the current time point, such that the satellite is continuously tracked by utilizing the corrected carrier frequency.

When intending to perform a next positioning, the GPS receiver returns to the step of calculating the position coordinate of each satellite at the current time point, and continuously executes the subsequent steps, until the positioning procedure is end.

To sum up, when the method for calculating the current position coordinate of the present invention is applied to the GPS receiver, the position coordinate may be updated at any time without repeatedly calculating and correcting and the code delay and the carrier frequency of the satellite at each ms, thereby greatly lowering the operation amount and reducing the power consumption.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
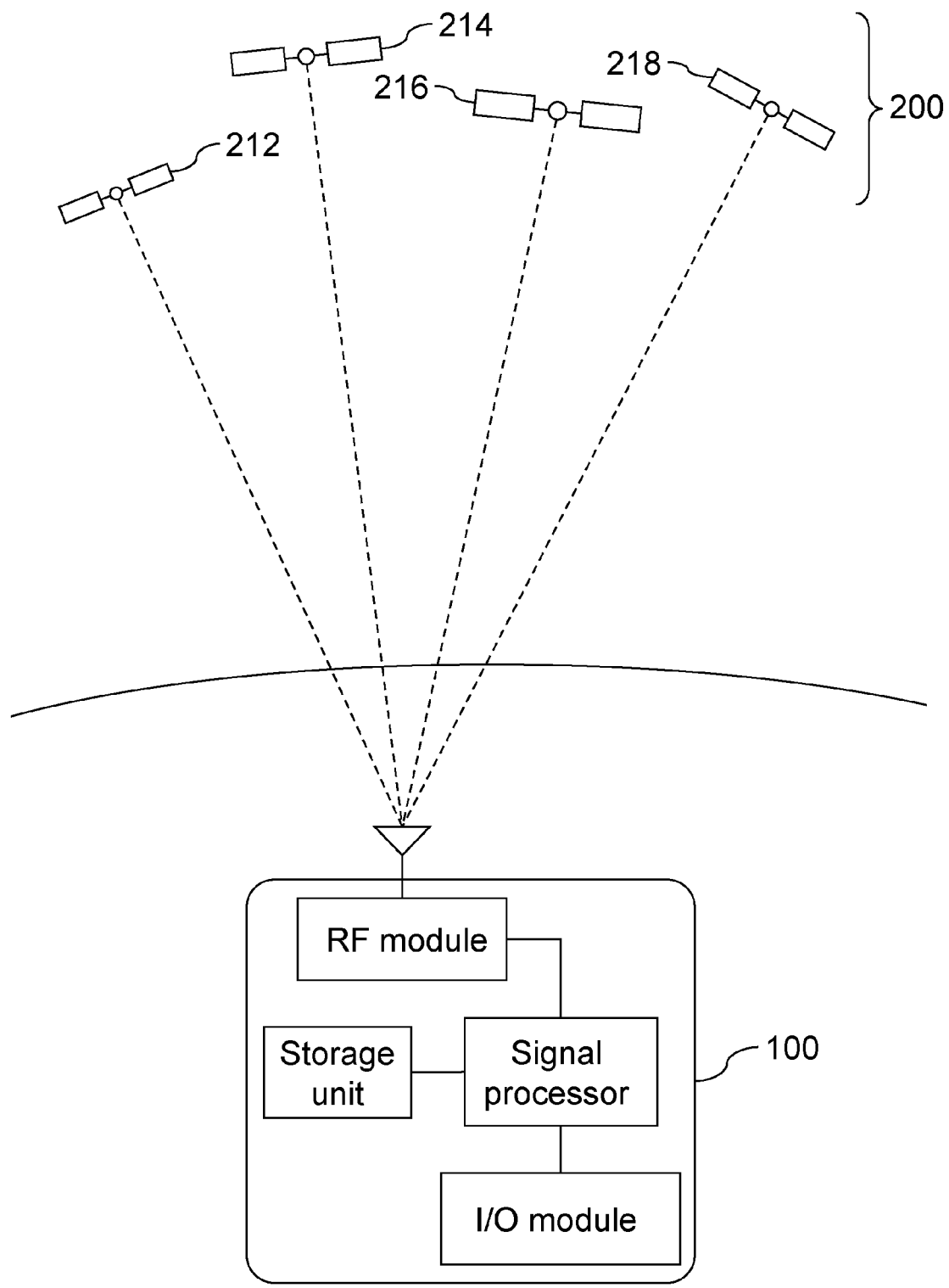
FIG. 1 is a GPS receiver according to an embodiment of the present invention.
Figure 2:
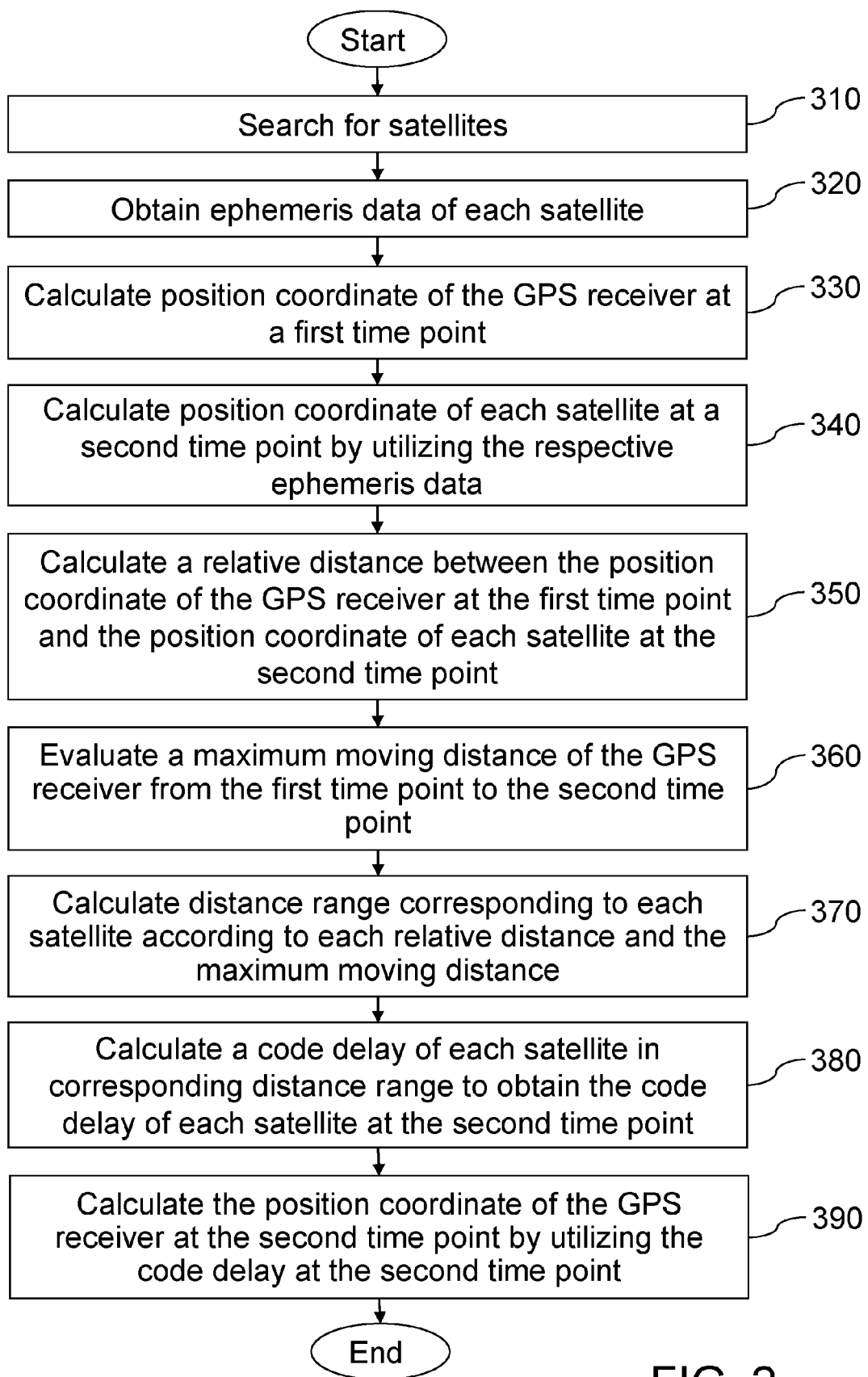
FIG. 2 is a flow chart of a method for calculating current position coordinate according to a first embodiment of the present invention.

FIG. 1 shows a GPS receiver according to an embodiment of the present invention, and FIG. 2 is a flow chart of a method for calculating current position coordinate according to a first embodiment of the present invention.

Referring to FIGS. 1 and 2, the method for calculating the current position coordinate is applicable to a GPS receiver 100.

After being started, the GPS receiver 100 searches for each satellite in a track satellite group 200 one by one, so as to track at least three satellites 212, 214, 216, and 218 in the track satellite group 200 (Step 310), and receives satellite signals of the at least three satellites 212, 214, 216, and 218 in the track satellite group 200, so as to download a series of ephemeris data, until obtaining the complete ephemeris data of the at least three satellites 212, 214, 216, and 218 (Step 320) (that is, a first time point (t1)).

When downloading the ephemeris data, the GPS receiver 100 calculates a phase difference of the satellite by utilizing a phase lock loop (PLL) at each millisecond (ms), and calculates a translation amount of the satellite by utilizing a delay lock loop (DLL). Thereafter, the GPS receiver 100 corrects a carrier frequency by utilizing the calculated phase difference, and corrects a code delay by utilizing the calculated translation amount. Then, the GPS receiver 100 continuously tracks the satellites 212, 214, 216, and 218 by utilizing the corrected carrier frequency at the next ms.

After obtaining the complete ephemeris data, the GPS receiver 100 processes positioning information.

At the first time point (t1), the GPS receiver 100 calculates pseudo ranges ($\rho_{j\_t1}$) between the at least three satellites 212, 214, 216, and 218 and the GPS receiver 100 at the first time point (t1) by utilizing the code delay of the satellite signal received at the first time point (t1). Here, the GPS receiver 100 has the complete ephemeris data of the satellites 212, 214, 216, and 218 with the pseudo range to be calculated.

The GPS receiver 100 obtains the position coordinates ($S_{j\_t1}$) of the satellites 212, 214, 216, and 218 at the first time point (t1) through the received ephemeris data, in which j is a satellite number, and is a positive integer.

Figure 3:
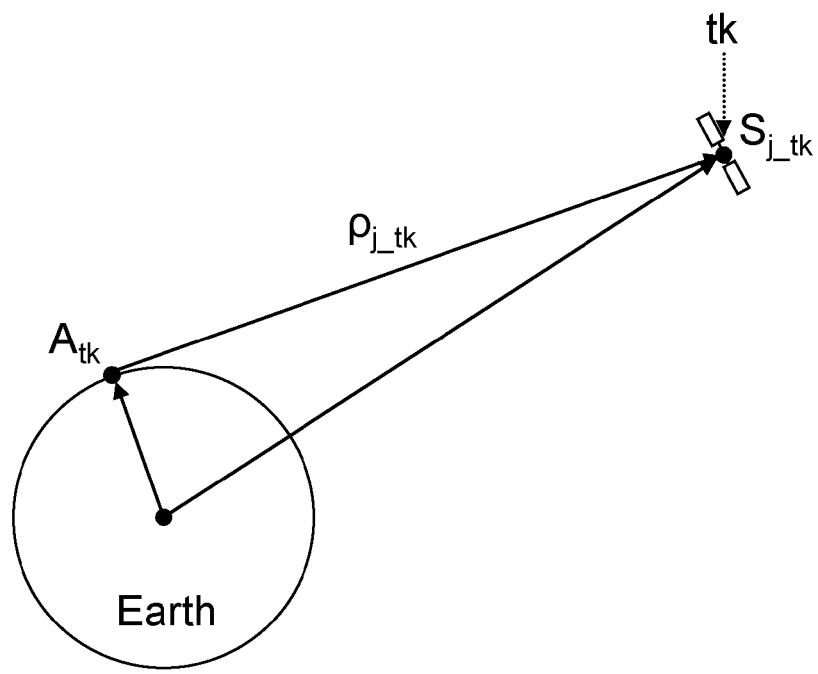
FIG. 3 shows a relative position between the GPS receiver applying an embodiment of the present invention and a satellite.

Then, the position coordinate ($A_{t1}$) of the GPS receiver 100 at the first time point (t1) is calculated by utilizing the pseudo range ($\rho_{j\_t1}$) at the first time point (t1), the position coordinates ($S_{j\_t1}$) of the satellites 212, 214, 216, and 218, and a Equation as follows (Step 330).

$$\rho_{j\_tk} = \|S_{j\_tk} - A_{tk}\| + C \times \Delta Tu \quad \text{Equation 1}$$

j is the satellite number, tk is a $k^{th}$ time point, $\rho_{j\_tk}$ is the pseudo range between the $j^{th}$ satellite and the GPS receiver at the $k^{th}$ time point, $S_{j\_tk}$ is the position coordinate of the $j^{th}$ satellite at the $k^{th}$ time point, $A_{tk}$ is the position coordinate of the GPS receiver at the $k^{th}$ time point, C is an electric wave transmission speed (generally the speed of light), and $\Delta Tu$ is a time error between a clock of the GPS receiver 100 and a system clock, as shown in FIG. 3, in which j is a positive integer, and k is a positive number.

When the GPS receiver 100 adopts three satellites for positioning, the position coordinate may be two-dimensional coordinate, that is, longitude and latitude. When the GPS receiver 100 adopts four satellites for positioning, the position coordinate may be three-dimensional coordinate, that is, longitude, latitude, and height.

When positioning at a second time point (t2), the GPS receiver 100 calculates the position coordinate ($S_{j\_t2}$) of each satellite 212/214/216/218 at the second time point (t2) by utilizing the ephemeris data of each satellite 212/214/216/218 (Step 340). Here, the second time point (t2) is later than the first time point (t1). Preferably, a time difference between the first time point (t1) and the second time point (t2) may be 1 second.

Then, a relative distance ($\Delta D_{1\_j} = \|S_{j\_t2} - A_{t1}\|$) between the position coordinate ($A_{t1}$) of the GPS receiver 100 at first time point (t1) and the position coordinate ($S_{j\_t2}$) of each satellite 212/214/216/218 at the second time point (t2) is calculated (Step 350).

A maximum moving distance ($D_{max\_t1 \to t2}$) of the GPS receiver 100 in a time range from the first time point (t1) to the second time point (t2) is evaluated (Step 360).

At least three distance ranges ($RangeD_{1\_j}$) corresponding to each satellite 212/214/216/218 are obtained, according to the relative distance ($\Delta D_{1\_j}$) between the position coordinate ($A_{t1}$) of the GPS receiver 100 at the first time point (t1) and the position coordinate ($S_{j\_t2}$) of each satellite 212/214/216/218 at the second time point (t2) and the maximum moving distance ($D_{max\_t1 \to t2}$) of the GPS receiver 100 (Step 370). Here, each distance range (RangeD$_{1\_j}$) may be the maximum moving distance ($D_{max\_t1 \to t2}$) with each relative distance ($\Delta D_{1\_j}$) as the center, that is, RangeD$_{1\_j}$=$\Delta D_{1\_j}$±$D_{max\_t1 \to t2}$. In other words, a start point ($D_{start1\_j}$) of each distance range (RangeD$_{1\_j}$) is a difference of each relative distance ($\Delta D_{1\_j}$) and the maximum moving distance ($D_{max\_t1 \to t2}$), that is, $D_{start1\_j}$=$\Delta D_{1\_j}$−$D_{max\_t1 \to t2}$, and an end point ($D_{end1\_j}$) of each distance range (RangeD$_{1\_j}$) is a sum of each relative distance ($\Delta D_{1\_j}$) and the maximum moving distance ($D_{max\_t1 \to t2}$), that is, $D_{end1\_j}$=$\Delta D_{1\_j}$+$D_{max\_t1 \to t2}$.

Then, the code delay of each satellite 212/214/216/218 in the corresponding distance range (RangeD$_{1\_j}$) is calculated by utilizing the DLL, so as to obtain the code delay of each satellite 212/214/216/218 at the second time point (t2) (Step 380).

For example, for the first satellite 212, the relative distance ($\Delta D_{1\_1}$=$\|S_{1\_t2}-A_{t1}\|$) corresponding to the first satellite 212 is obtained by utilizing the position coordinate ($A_{t1}$) of the GPS receiver 100 at the first time point (t1) and the position coordinate ($S_{1\_t2}$) of the first satellite 212 at the second time point (t2). Then, the first distance range (RangeD$_{1\_1}$) corresponding to the first satellite 212 is obtained by utilizing the relative distance ($\Delta D_{1\_1}$) corresponding to the first satellite 212 and the maximum moving distance ($D_{max\_t1 \to t2}$) of the GPS receiver 100. Therefore, the code delay of the first satellite 212 in the first distance range (RangeD$_{1\_1}$) is calculated, so as to obtain the code delay of the first satellite at the second time point (t2).

Then, the position coordinate ($A_{t2}$) of the GPS receiver 100 at the second time point (t2) is calculated by utilizing the code delay of each satellite 212/214/216/218 at the second time point (t2) (Step 390).

Figure 4:
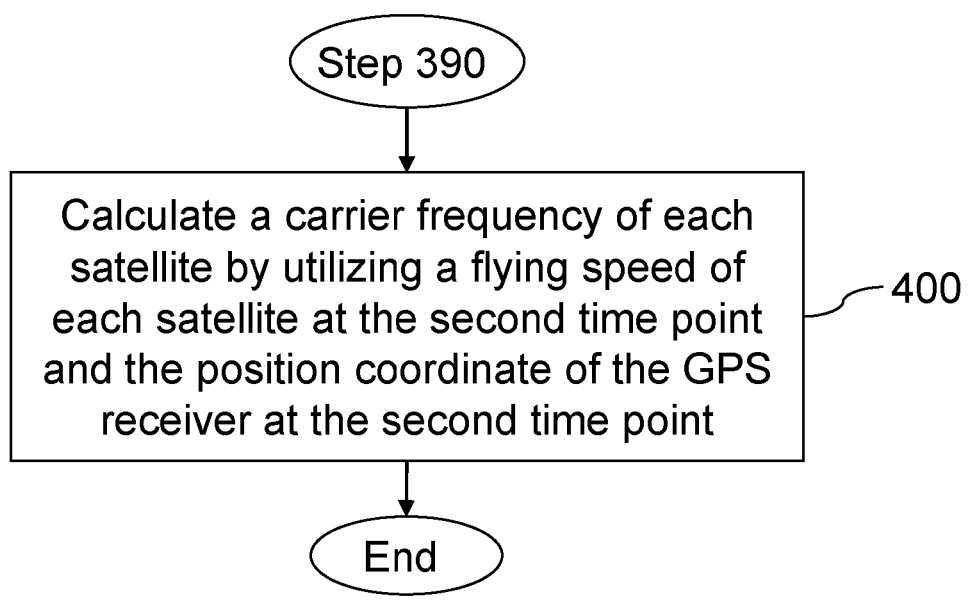
FIG. 4 is a flow chart of the method for calculating current position coordinate according to a second embodiment of the present invention.

Further, the carrier frequency of each satellite 212/214/216/218 at the second time point (t2) is calculated by utilizing the flying speed of each satellite 212/214/216/218 at the second time point (t2) and the position coordinate ($A_{t2}$) of the GPS receiver 100 at the second time point (t2) (Step 400), as shown in FIG. 4.

Therefore, each satellite 212/214/216/218 is continuously tracked by utilizing the corrected carrier frequency of each satellite 212/214/216/218 at the second time point (t2).

Similarly, the GPS receiver 100 performs the positioning at a third time point (t3) by utilizing the position coordinate ($A_{t2}$) of the GPS receiver 100 at the second time point (t2).

When positioning at the third time point (t3), the GPS receiver 100 calculates the position coordinate ($S_{j\_t3}$) of each satellite 212/214/216/218 at the third time point (t3) by utilizing the ephemeris data of each satellite 212/214/216/218.

Then, the relative distance ($\Delta D_{2\_j}$=$\|S_{j\_t3}-A_{t2}\|$) between the position coordinate ($A_{t2}$) of the GPS receiver 100 at the second time point (t2) and the position coordinate ($S_{j\_t3}$) of each satellite 212/214/216/218 at the third time point (t3) is calculated.

The maximum moving distance ($D_{max\_t2 \to t3}$) of the GPS receiver 100 in the time range from the second time point (t2) to the third time point (t3) is evaluated.

At least three distance ranges (RangeD$_{2\_j}$=$\Delta D_{2\_j}$±$D_{max\_t2 \to t3}$) corresponding to each satellite 212/214/216/218 are obtained, according to the relative distance ($\Delta D_{2\_j}$) between the position coordinate ($A_{t2}$) of the GPS receiver 100 at second time point (t2) and the position coordinate ($S_{j\_t3}$) of each satellite 212/214/216/218 at the third time point (t3) and the maximum moving distance ($D_{max\_t2 \to t3}$) of the GPS receiver 100.

Then, the code delay of each satellite 212/214/216/218 in the corresponding distance range (RangeD$_{2\_j}$) is calculated by utilizing the DLL, so as to obtain the code delay of each satellite 212/214/216/218 at the third time point (t3).

Then, the position coordinate ($A_{t3}$) of the GPS receiver 100 at the third time point (t3) is calculated by utilizing the code delay of each satellite 212/214/216/218 at the third time point (t3).

Further, the carrier frequency of each satellite 212/214/216/218 at the third time point (t3) is calculated and corrected by utilizing the flying speed of each satellite 212/214/216/218 at the third time point (t3) and the position coordinate ($A_{t3}$) of the GPS receiver 100 at the third time point (t3), such that each satellite 212/214/216/218 is continuously tracked by utilizing the corrected carrier frequency.

Similarly, at each subsequent positioning time point, the GPS receiver 100 may obtain the new positioning information by utilizing the same method, and may continuously track each satellite 212/214/216/218.

Here, after finishing searching for the satellites, the GPS receiver 100 according to an embodiment of the present invention obtains the complete ephemeris data of each satellite 212/214/216/218 to be used for positioning. Except that the position coordinate ($A_{t1}$) of the initial positioning time point is obtained by utilizing three or four points positioning during the initial positioning, at the subsequent positioning time points, the code delay and the carrier frequency of each satellite 212/214/216/218, and the position coordinate ($A_{tk}$) of the GPS receiver 100 at that time are obtained by utilizing the current information, that is, the position coordinate ($A_{t(k-1)}$) obtained at the last positioning time point and the ephemeris data. In this manner, the GPS receiver 100 applying an embodiment of the present invention may obtain the position coordinate at each second without repeatedly calculating the phase difference and the translation amount of the satellite at each ms for correcting the code delay and the carrier frequency of the satellite 214/214/216/218. Therefore, the operation amount of the GPS receiver 100 applying an embodiment of the present invention is greatly reduced to once per second from 1000 times per second in the conventional art, thereby reducing the power consumption accordingly. It should be noted that although the time difference between the first time point (t1) and the second time point (t2) is 1 second for illustration, in the method for calculating the current position coordinate according to the present invention, the time difference is not limited to 1 second. As long as the phase difference and the translation amount of the satellite are calculated with a time longer than the conventional art by utilizing the embodiment having the above steps, it falls within the protection scope of the method for calculating the current position coordinate according to the present invention.

Figure 5:
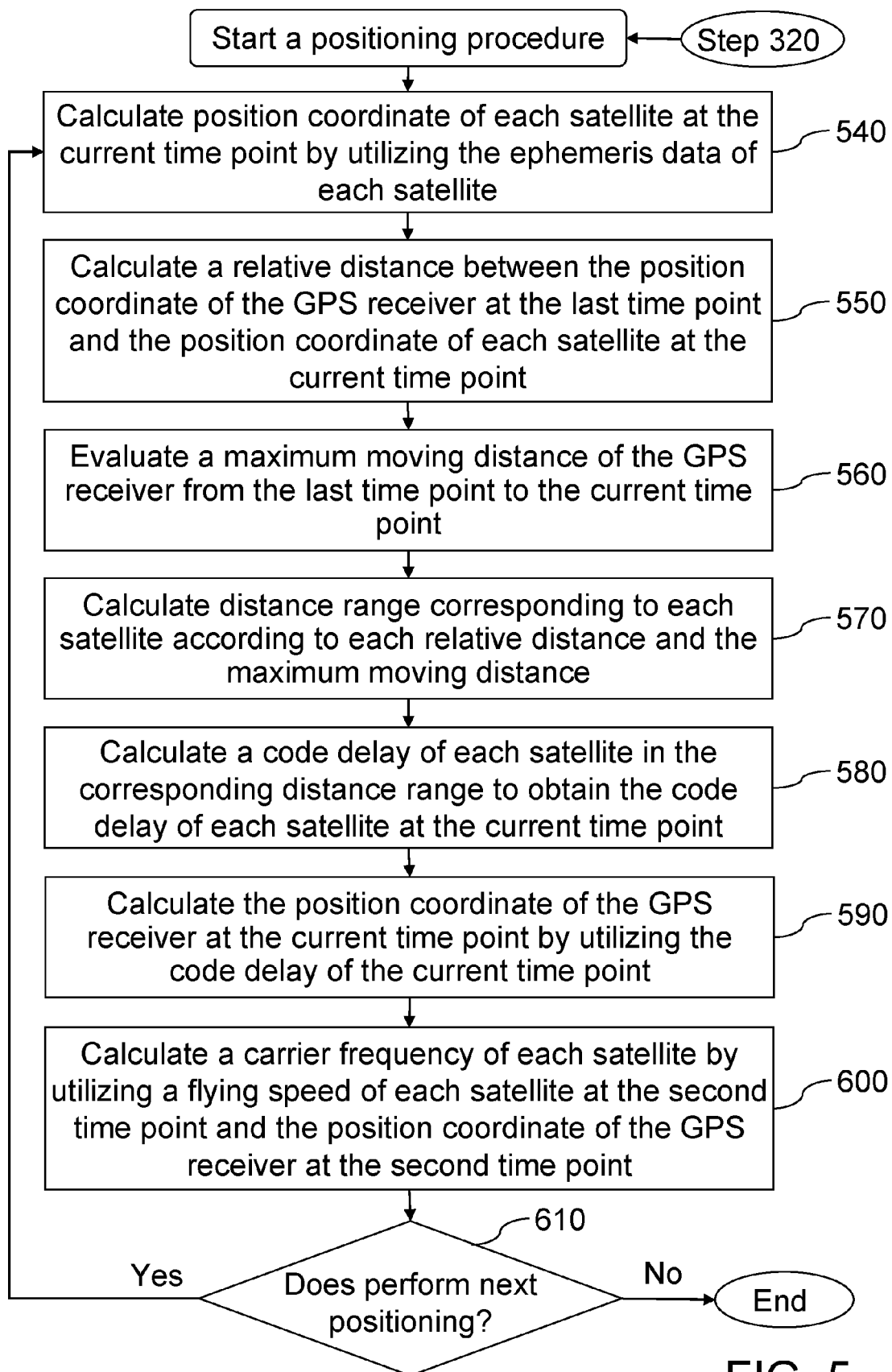
FIG. 5 is a flow chart of the method for calculating current position coordinate according to a third embodiment of the present invention.

In other words, referring to FIG. 5, after starting and self-testing, the GPS receiver 100 searches for each satellite in the track satellite group 200 one by one, so as to track at least three satellites 212, 214, 216, and 218 in the track satellite group 200 (Step 310), and receives the satellite signals of the at least three satellites 212, 214, 216, and 218 in the track satellite group 200, so as to download a series of ephemeris data, until obtaining the complete ephemeris data of the at least three satellites 212, 214, 216, and 218 (Step 320).

When positioning, the GPS receiver 100 calculates the position coordinate ($A_{tn}$) of the GPS receiver 100 at the current time point (tn) by utilizing the ephemeris data of each satellite 212/214/216/218 and the position coordinate ($A_{t(n-1)}$) of the GPS receiver 100 at the last time point (t(n−1)), in which tn represents an $n^{th}$ time point and t(n−1) represents an $(n-1)^{th}$ time point, that is, the last positioning time point of the $n^{th}$ time point, and n−1 is greater than 0.

When positioning at the current time point (tn), the GPS receiver 100 calculates the position coordinate ($S_{j\_tn}$) of each satellite 212/214/216/218 at the current time point (tn) by utilizing the ephemeris data of each satellite 212/214/216/218 (Step 540).

Then, the relative distance ($\Delta D_{(n-1)\_j} = \|S_{j\_tn} - A_{t(n-1)}\|$) between the position coordinate ($A_{t(n-1)}$) of the GPS receiver 100 at the last time point (t(n−1)) and the position coordinate ($S_{j\_tn}$) of each satellite 212/214/216/218 at the current time point (tn) is calculated (Step 550).

The maximum moving distance ($D_{max\_t(n-1)\to tn}$) of the GPS receiver 100 in the time range from the last time point (t(n−1)) to the current time point (tn) is evaluated (Step 560).

At least three distance ranges ($RangeD_{(n-1)\_j} = \Delta D_{(n-1)\_j} \pm D_{max\_t(n-1)\to tn}$) corresponding to each satellite 212/214/216/218 are obtained, according to the relative distance ($\Delta D_{(n-1)\_j}$) between the position coordinate ($A_{t(n-1)}$) of the GPS receiver 100 at last time point (t(n−1)) and the position coordinate ($S_{j\_tn}$) of each satellite 212/214/216/218 at the current time point (tn) and the maximum moving distance ($D_{max\_t(n-1)\to tn}$) of the GPS receiver 100 (Step 570).

Then, the code delay of each satellite 212/214/216/218 in the corresponding distance range ($RangeD_{(n-1)\_j}$) is calculated by utilizing the DLL, so as to obtain the code delay of each satellite 212/214/216/218 at the current time point (tn) (Step 580).

Then, the position coordinate ($A_{tn}$) of the GPS receiver 100 at the current time point (tn) is calculated by utilizing the code delay of each satellite 212/214/216/218 at the current time point (tn) (Step 590).

Further, the carrier frequency of each satellite 212/214/216/218 at the current time point (tn) is calculated and corrected by utilizing the flying speed of each satellite 212/214/216/218 at the current time point (tn) and the position coordinate ($A_{tn}$) of the GPS receiver 100 at the current time point (tn) (Step 600), such that each satellite 212/214/216/218 is continuously tracked by utilizing the corrected carrier frequency.

Then, GPS receiver 100 judges whether it is necessary to perform the next positioning or not (Step 610). If yes, the procedure returns to Step 540, and Steps 540 to 610 are continuously executed, until the positioning procedure is end.

Here, the method for calculating the current position coordinate according to the present invention may be built in a storage unit of the GPS receiver through software or firmware programs, and a processor of the GPS receiver executes the built-in software or firmware programs, so as to implement the method for calculating the current position coordinate according to the present invention. The storage unit is realized by one or more memories.

The GPS receiver usually includes an antenna, a radio frequency (RF) module, a controller, and an input/output (I/O) module.

The antenna is electrically connected to the RF module. The RF module has an oscillator. The RF module provides a specific frequency by utilizing the oscillator, and is wirelessly connected to the satellites in the track satellite group through the antenna by utilizing the specific frequency. After the RF module and the satellite form the wireless connection, the RF module wirelessly receives the satellite signals of the satellites through the antenna.

The controller is electrically connected to the RF module, and resolves the satellite signals received by the RF module, so as to obtain various positioning information from the satellite signals. The positioning information includes pseudo-random codes, the ephemeris data, and other data.

The I/O module is electrically connected to the controller. The I/O module provides the user interface and/or various input and/or output connection ports.

The controller may be the processor, and may also be an additionally disposed controller.

Further, the GPS receiver is a single unit device, and may also be integrated with other devices (for example, a mobile communication device and a computer).

To sum up, when the method for calculating the current position coordinate according to the present invention is applied to the GPS receiver, the operation amount is greatly reduced, thereby reducing the power consumption.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for calculating current position coordinate, applicable to a global positioning system (GPS) receiver, comprising:
    Step 1: searching for at least three satellites;
    Step 2: obtaining an ephemeris data of each of the at least three satellites at a first time point;
    Step 3: calculating a position coordinate of the GPS receiver at the first time point by utilizing the ephemeris data of each satellite;
    Step 4: calculating a position coordinate of each satellite at a second time point by utilizing the ephemeris data of each satellite, wherein the second time point is later than the first time point;
    Step 5: calculating a relative distance between the position coordinate of the GPS receiver at the first time point and the position coordinate of each satellite at the second time point;
    Step 6: evaluating a maximum moving distance of the GPS receiver from the first time point to the second time point;
    Step 7: calculating at least three distance ranges corresponding to the at least three satellites according to the respective relative distances and the maximum moving distance;
    Step 8: calculating a code delay of each satellite in the corresponding distance range to obtain the code delay of each satellite at the second time point; and
    Step 9: calculating the position coordinate of the GPS receiver at the second time point by utilizing the code delay at the second time point.

2. The method for calculating current position coordinate according to claim 1, further comprising:
    Step 10: calculating a carrier frequency of each satellite at the second time point by utilizing a flying speed of each satellite at the second time point and the position coordinate of the GPS receiver at the second time point.

3. The method for calculating current position coordinate according to claim 1, wherein the Step 8 comprises calculating the code delay of each satellite in the corresponding distance range by utilizing a delay lock loop (DLL).

4. The method for calculating current position coordinate according to claim 1, wherein a time difference between the first time point and the second time point is 1 second.

5. The method for calculating current position coordinate according to claim 1, wherein in the Step 7, a start point of each distance range is a difference of each relative distance and the maximum moving distance, and an end point of each distance range is a sum of each relative distance and the maximum moving distance.

6. A method for calculating current position coordinate, applicable to a global positioning system (GPS) receiver, comprising:
   searching for at least three satellites, so as to obtain ephemeris data of the at least three satellites; and
   calculating position coordinate of the GPS receiver at a current time point by utilizing the ephemeris data of each satellite and the position coordinate of the GPS receiver at a last time point, comprising:
      calculating position coordinate of each satellite at the current time point by utilizing the ephemeris data of each satellite;
      calculating a relative distance between the position coordinate of the GPS receiver at the last time point and the position coordinate of each satellite at the current time point;
      evaluating a maximum moving distance of the GPS receiver from the last time point to the current time point;
      calculating at least three distance ranges corresponding to the at least three satellite according to the respective relative distances and the maximum moving distance;
      calculating a code delay of each satellite in the corresponding distance range to obtain the code delay of each satellite at the current time point; and
      calculating the position coordinate of the GPS receiver at the current time point by utilizing the code delay of the current time point.

7. The method for calculating current position coordinate according to claim 6, wherein the step of calculating the position coordinate of the GPS receiver at the current time point by utilizing the ephemeris data of each satellite and the position coordinate of the GPS receiver at the last time point further comprises:
   calculating a carrier frequency of each satellite at the second time point by utilizing a flying speed of each satellite at the current time point and the position coordinate of the GPS receiver at the current time point.

8. The method for calculating current position coordinate according to claim 6, wherein the step of calculating the code delay of each satellite in the corresponding distance range comprises calculating the code delay of each satellite in the corresponding distance range by utilizing a delay lock loop (DLL).

9. The method for calculating current position coordinate according to claim 6, wherein a time difference between the last time point and the current time point is 1 second.

10. The method for calculating current position coordinate according to claim 6, further comprising repeatedly executing the step of calculating the position coordinate of the GPS receiver at the current time point by utilizing the ephemeris data of each satellite and the position coordinate of the GPS receiver at the last time point, thereby continuously obtaining the latest position coordinate of the GPS receiver.

11. The method for calculating current position coordinate according to claim 6, wherein a start point of each distance range is a difference of each relative distance and the maximum moving distance, and an end point of each distance range is a sum of each relative distance and the maximum moving distance.

* * * * *